H. L. INGERSOLL.
BOOSTER MOTOR FOR LOCOMOTIVES.
APPLICATION FILED MAY 22, 1919.

1,339,395.

Patented May 11, 1920.

INVENTOR- HOWARD L. INGERSOLL
BY F. R. Cornwall Atty.

UNITED STATES PATENT OFFICE.

HOWARD L. INGERSOLL, OF WHITE PLAINS, NEW YORK.

BOOSTER-MOTOR FOR LOCOMOTIVES.

1,339,395.   Specification of Letters Patent.   Patented May 11, 1920.

Application filed May 22, 1919. Serial No. 299,037.

*To all whom it may concern:*

Be it known that I, HOWARD L. INGERSOLL, a citizen of the United States, residing at White Plains, New York, have invented a certain new and useful Improvement in Booster-Motors for Locomotives, of which the following is a full, clear, and exact description, such as will enable others skilled in the art to which it appertains to make and use the same, reference being had to the accompanying drawings, forming part of this specification, in which—

This invention relates to a new and useful improvement in booster motors for locomotives of the type illustrated in an application serially numbered 194,355, filed by me on the 2nd day of October, 1917.

The booster motor shown in the accompanying drawings is shown as being mounted upon the trailer truck of the locomotive where it is geared to drive the trailer truck axle. This axle and its carried wheels, which would otherwise be "dead," are thus made to form an important and essential factor when the locomotive is starting or operating at low speeds or when going up-grades, etc. The booster motor is designed to be cut out automatically when the locomotive attains a predetermined speed, say for instance, twelve miles an hour; but this governing or cut out mechanism forms no part of my present invention, it being disclosed in a companion application filed by me Oct. 20, 1919, serially numbered 331,877.

The main object in view in the present invention is to equip a locomotive with a booster motor without in any way disturbing, impairing, changing or modifying the normal functions and methods of operation of the locomotive; and, indeed, other than mounting the motor on the truck and equipping the locomotive with the necessary pipes and valves constituting the control system therefor, no change whatever is made in the design or construction of the locomotive. Thus locomotives now extant can readily be equipped with my improved booster motor without material or substantial change in their construction and method of operation.

By mounting the booster motor to drive the otherwise dead axle of the locomotive and supporting its weight on a truck carrying said otherwise dead axle, the wheels of which are normally the weight supporting wheels for the locomotive, I do not disturb the designed traction power of the main driving wheels of the locomotive nor impose any extra load thereon, and consequently by distributing the traction power of the locomotive, it is unnecessary to modify existing rail, road-bed and bridge constructions.

Another object of my invention is to utilize air pressure generated by the main locomotive for the air brake system as a medium of control for the booster motor. This air pressure in the train pipe system is usually maintained at around one hundred thirty pounds pressure per square inch, and hence it constitutes an effective medium, is easily handled and very convenient and accessible in the control of the booster motor. As but a small quantity is necessary to operate the booster motor controlling valves, the pressure in the train pipe system is not materially affected; but, if desired, a supplemental reservoir for the booster motor control may be supplied from the main reservoir of the train pipe system so that said main reservoir will not be "bled" where the booster motor is being frequently brought into operation.

In the drawings, 1 indicates the shell of a locomotive boiler and 2 the steam dome thereof, 3 is the dry steam pipe leading from the steam dome down to the main cylinders 4 of the locomotive. I have shown a conventional form of throttle valve 76 for controlling the upper end of the dry steam pipe 3, said valve being operated by a rod 77 connected to the throttle lever 78 located in the cab of the locomotive and operable at will by the engineer.

5 are the main driving wheels of the locomotive, 6 the pilot truck wheels and 7 the trailer truck wheels, the latter being mounted in journal boxes guided by pedestal jaws in the side frame pieces of a trailer truck frame 8, the details of which form no part of this present invention.

Figure 5:
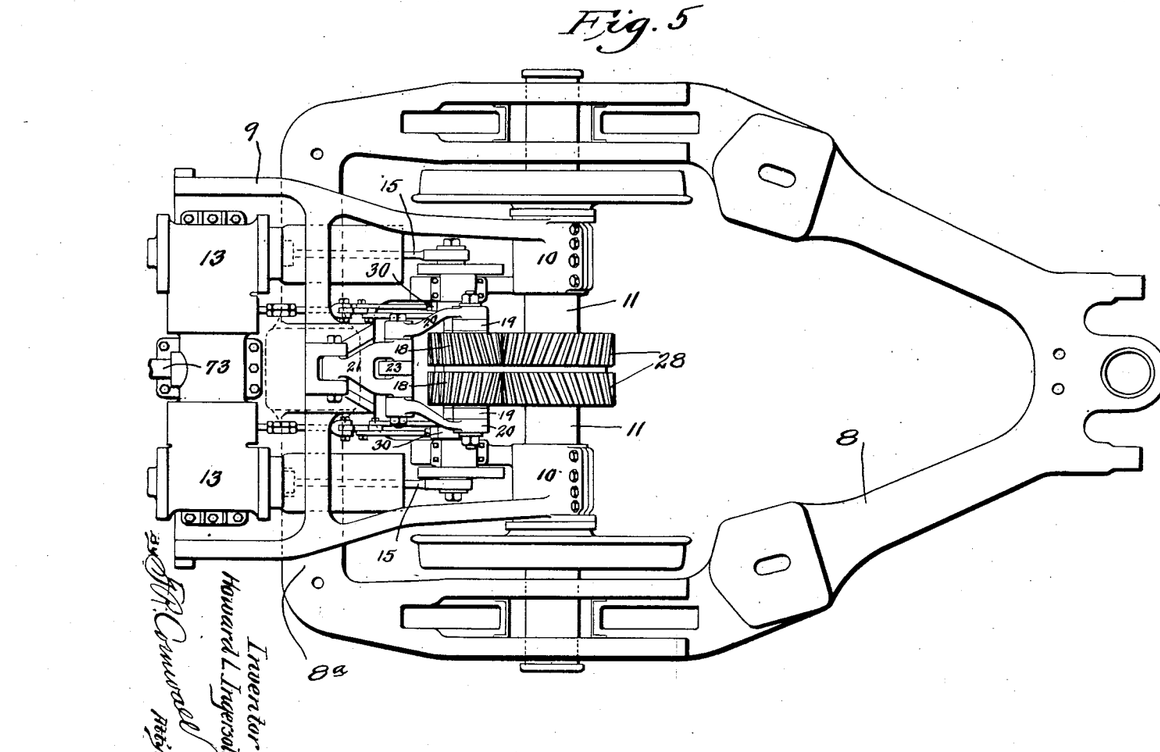
Fig. 5 is a plan view of the booster motor showing the same mounted on the trailer truck of the locomotive.
Figure 6:
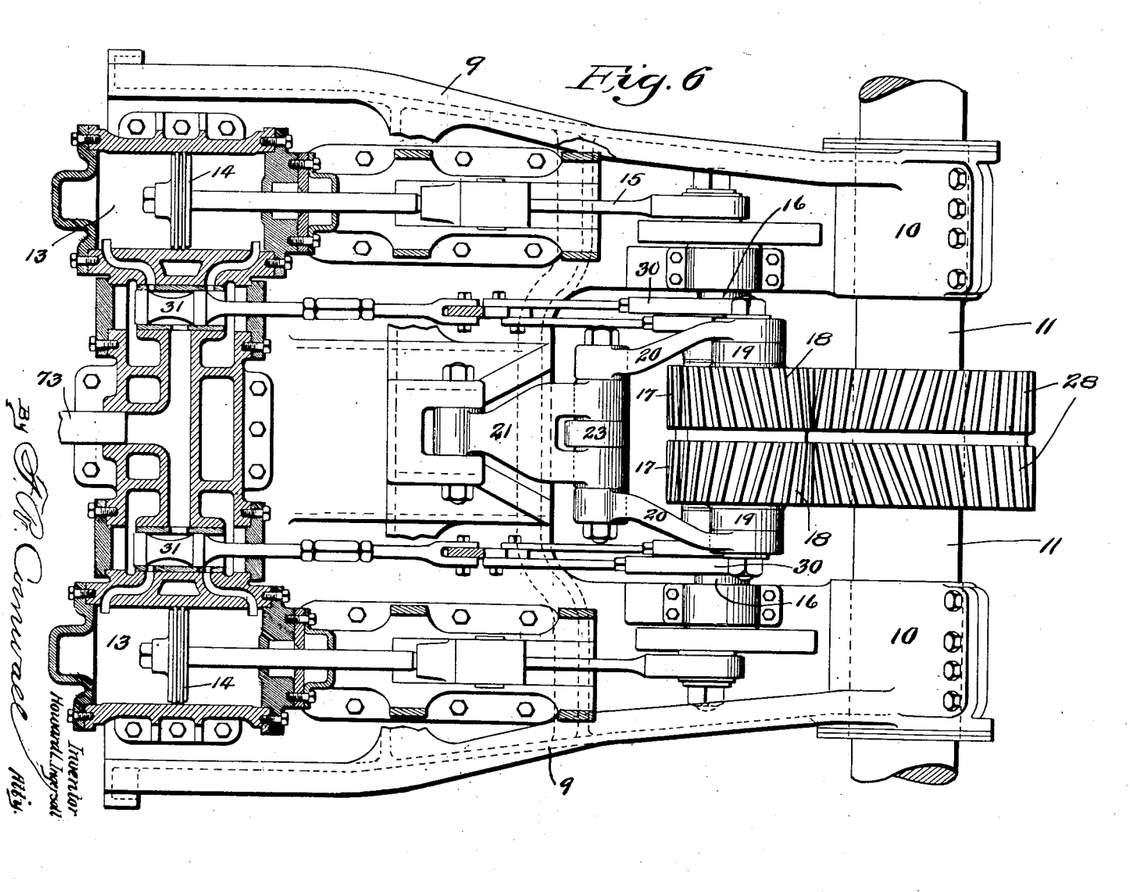
Fig. 6 is an enlarged view, partly in horizontal section, of the booster motor.
Figure 11:
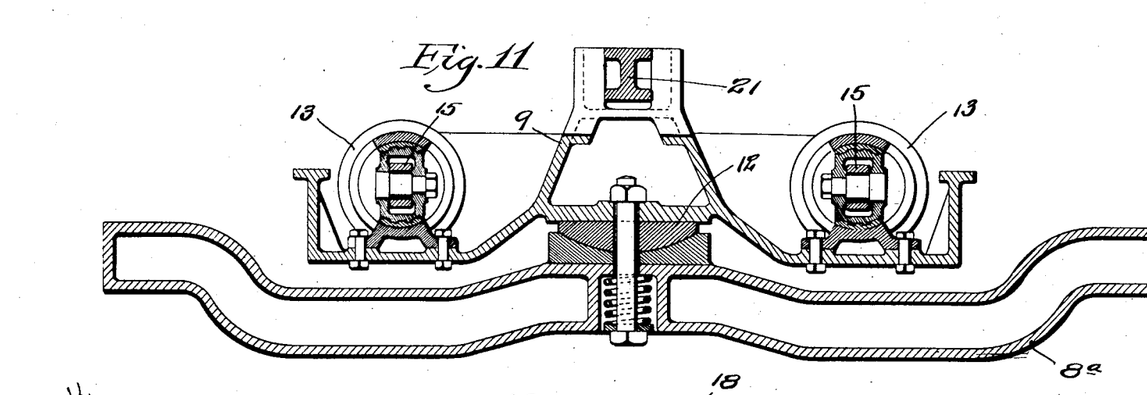
Fig. 11 is a sectional view on line 11—11 of Fig. 6.
Figure 12:
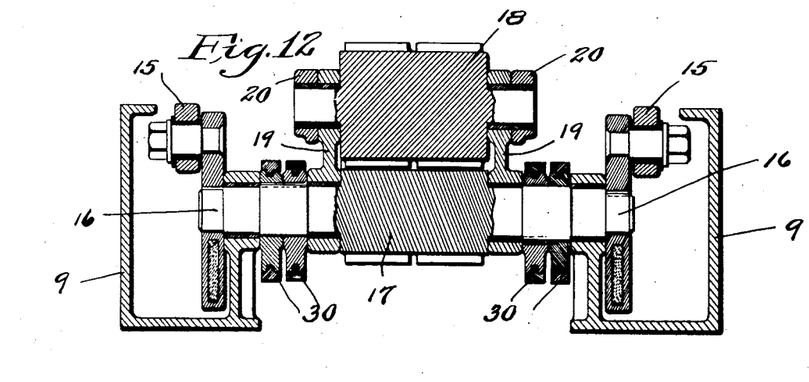
Fig. 12 is a sectional view on line 12—12 of Fig. 6.

9 indicates a bed-plate for the booster motor, preferably in the form of a casting, whose forward end is provided with bearings 10, spread apart as shown in Figs. 5 and 6, to embrace the axle 11 on which the trailer truck wheels are mounted. The details of construction of this booster motor bed-plate, and the manner of mounting the same on the trailer truck axle and supporting its rear end by a rocker bearing 12, shown in Figs. 7 and 11, which rocker bearing is arranged above the rear cross-bar member of the trailer truck frame, are also features which form no part of this present invention.

The booster motor *per se* preferably consists of a pair of cylinders 13, in which are arranged pistons 14 connected to crossheads and operating pitmen 15, the latter being connected to a crank shaft 16 mounted in bearings on the bed-plate 8. This crank shaft 16 carries twin skew gears 17 in mesh with corresponding gears 18, the latter being mounted on rock arms 19 pivotally arranged on the crank shaft 16.

20 and 21 are the members of a toggle mechanism connected to the upper ends of the arms 19 and to the bed plate; pintle bolt 22 forms a hinge connection between the links of the toggle, while an eye 23 pivotally connected to said pintle bolt, is attached to a piston rod 24, having a piston 25 arranged at its lower end operating in a cylinder 26. A spring 27 arranged above the piston tends at all times to depress the piston rod and break the toggle, moving it to the position shown in dotted lines in Fig. 7, wherein the gear 18 is thrown out of mesh with a gear 28 arranged on the trailer truck axle 11. A pipe leading from a source of air pressure supply, to be hereinafter described, admits pressure under the piston 25 to raise it and move the gear 18 into mesh with the gear 28. When this pressure is exhausted, the spring 27 disentrains the gears. I do not claim in this application the construction and arrangement of this toggle mechanism for entraining and disentraining the gears, as the same forms the subject-matter of an application, Serial No. 310,508, filed by Ray M. Brown on July 12, 1919.

Figures 7, 8:
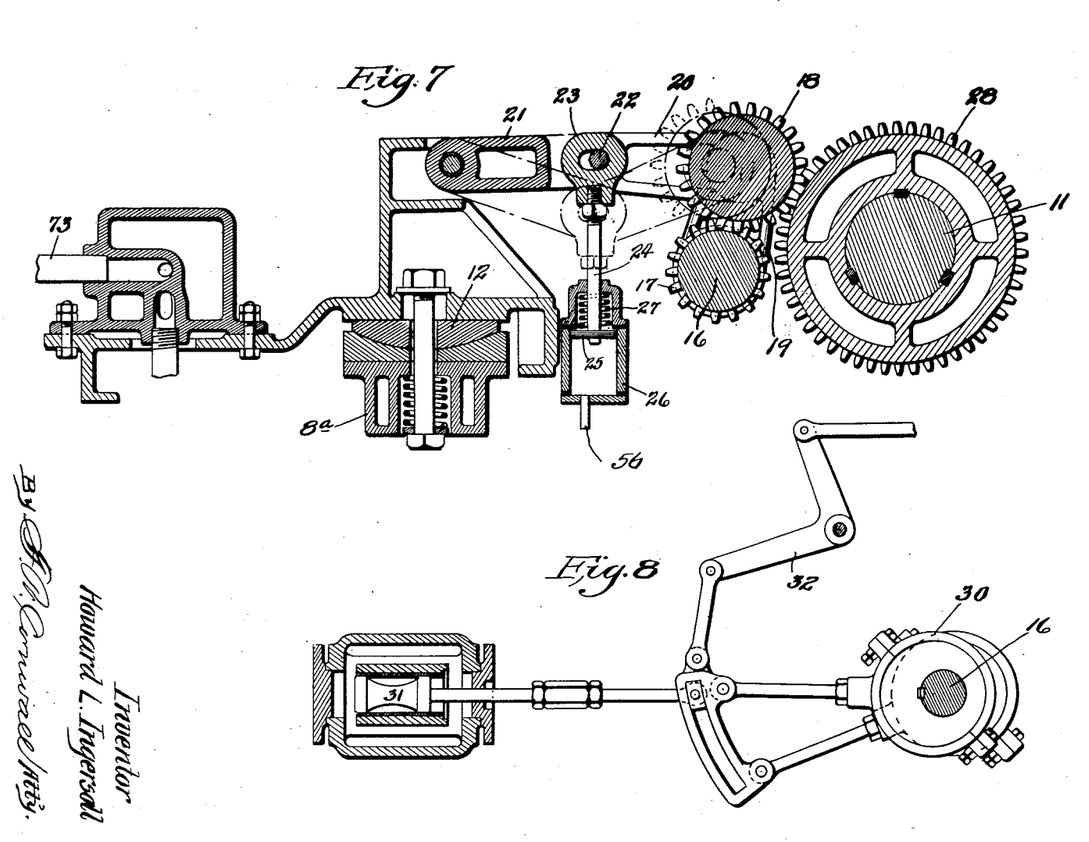
Fig. 7 is a longitudinal sectional view through the center of the motor showing the entraining mechanism.
Fig. 8 is a detail view of the valve gear for the booster motor.
Figure 9:
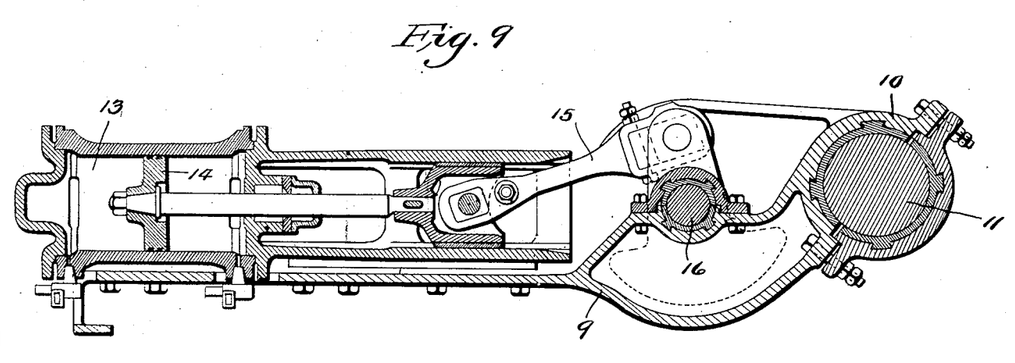
Fig. 9 is a sectional view on the line 9—9 of Fig. 6.
Figure 10:
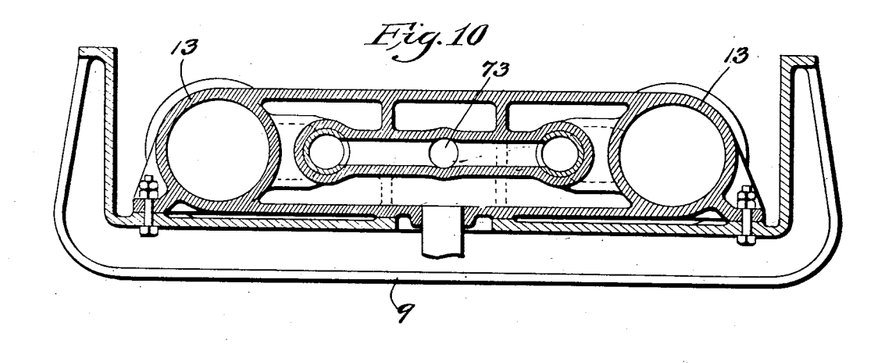
Fig. 10 is a sectional view on the line 10—10 of Fig. 6.

In Fig. 8, I have shown a reversing valve mechanism for the cylinders 13, the same being in the form of eccentrics 30 mounted on the crank shaft 16 and connected by suitable links to appropriately operate valves 31 arranged in the steam chest to drive the booster motor, depending upon the direction in which the main locomotive is intended to be driven.

Figure 1:
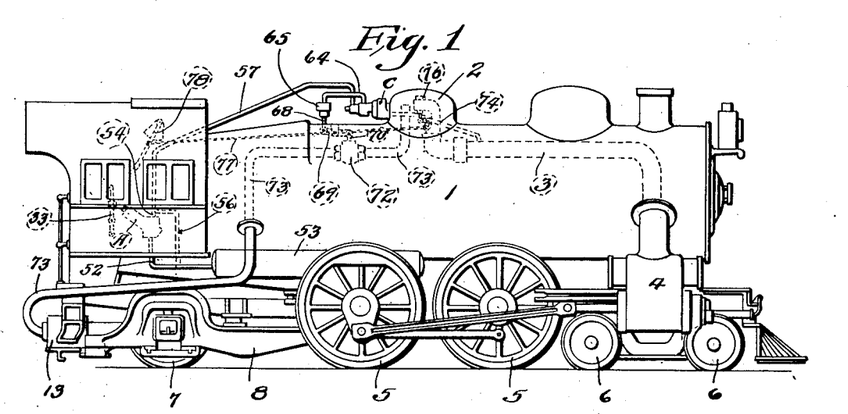
Figure 1 is a conventional illustration of a locomotive equipped with my improved booster motor.
Figure 4:
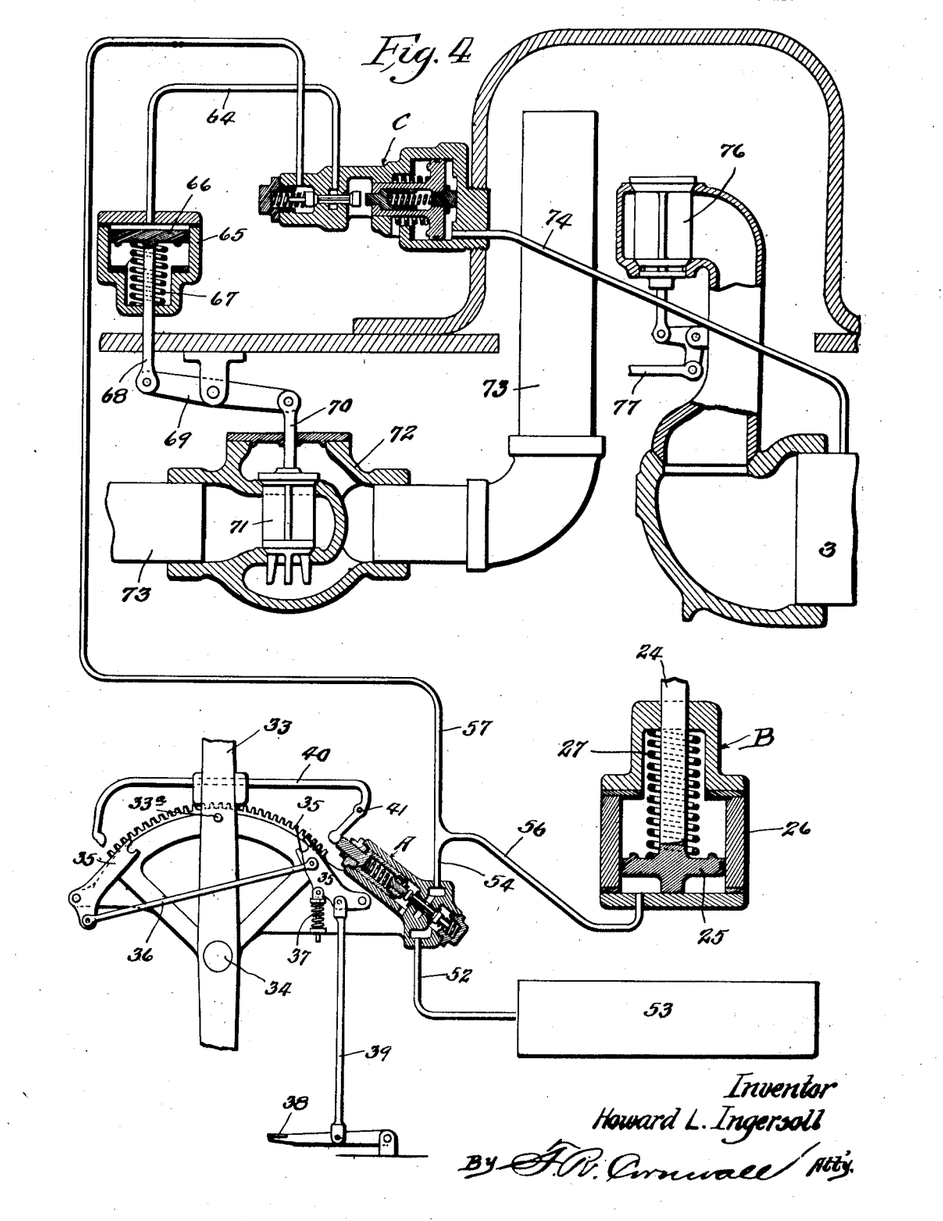
Fig. 4 is a diagrammatic view illustrating the control system.

Referring now to Fig. 4, 33 indicates the reverse lever of the locomotive pivoted at 34 and having a dog (not shown) which coöperates with teeth 35. This reverse lever operates in the usual way to position the valve mechanism for the main cylinders of the locomotive. When the reverse lever is thrown forward, or into the "corner" (as it is colloquially expressed), it will position the valve mechanism so that the same will be given the full stroke and the main cylinders of the locomotive receive steam throughout substantially their full stroke. This is the usual practice in starting locomotives. When the reverse lever is pulled rearwardly from its central position, the valve mechanism is so positioned that the locomotive will be driven backwardly. After the reverse lever is positioned forwardly or backwardly, as the case may be, then the throttle valve, the lever 78 of which is shown in Fig. 1 and which is, of course, present in all locomotives, is operated to admit steam to the main cylinders through the dry steam pipe 3. In order to control the throw of the reverse lever, I provide the same with a pin or projection 33ª in the path of which are arranged two oppositely disposed dogs 35. These dogs will arrest the reverse lever just one notch short of its full stroke in either direction and normally prevent its operating the booster motor controlling valve. As the reverse lever is capable of movement to either one of two extreme positions I connect the dogs 35 by means of a rod 36 arranged on opposite sides of the pivotal points of said dogs. A spring 37 tends to hold the dogs in position, and a foot lever 38 connected by a rod 39 to one of the dogs can be operated so as to simultaneously depress both dogs out of the path of travel of the pin 33ª at the will of the engineer, and thus enable the reverse lever to move its full stroke and operate the booster motor controlling valve.

40 indicates an overhanging extension in the form of a lever pivoted at 41, having projections lying in the path of movement of the reverse lever so that when said reverse lever is moved to its extreme position in either direction, said lever 40 will be rocked to operate the booster motor controlling valve.

Figure 2:
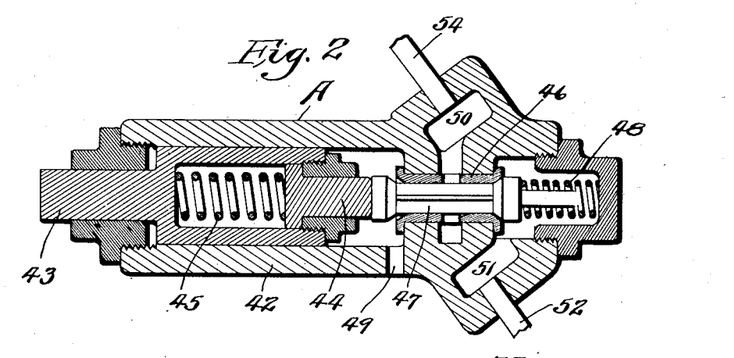
Fig. 2 is a detail view of one of the valves used in the booster motor control system.

The details of construction of this booster motor controlling valve are best seen in Fig. 2, wherein the letter "A" indicates the valve in its entirety, which will be seen to consist of a casing 42 having a plunger 43 slidingly arranged therein, which plunger carries a movable head 44 in its inner end normally held in position by a spring 45 arranged within the plunger 43. 46 is a bushing forming a mount for a double-headed valve 47 designed to alternately coöperate with seats at opposite ends of the bushing 46. A spring 48 tends to normally hold valve 47 in position to close the outer seat, and in this position of the valve the inner head of the valve is unseated and an exhaust port 49 thereby opened to a chamber 50. 51 is the pressure chamber of the valve which is connected by means of a pipe 52 to an air-pressure reservoir 53. Thus, it may be said that pressure is constantly in the chamber 51, and that the chamber 51 is normally blocked or stopped by the outer head of the valve 47 being seated home.

When, however, the foot treadle 38 is depressed and the reverse lever 33 moved to either of its extreme positions, the plunger 43 will be moved inwardly to unseat the outer head of the valve 47 and move the inner head of said valve 47 to its seat, thus establishing communication between the pressure chamber 51 and the chamber 50 and the exhaust port 49 is now closed.

We will assume for the purposes of this description that the locomotive is at a standstill and that the reverse lever has been thrown to either of its extreme positions so as to operate the valve 47 thus closing the exhaust 49 and establishing communication between the chambers 51 and 50, as above described.

Figure 3:
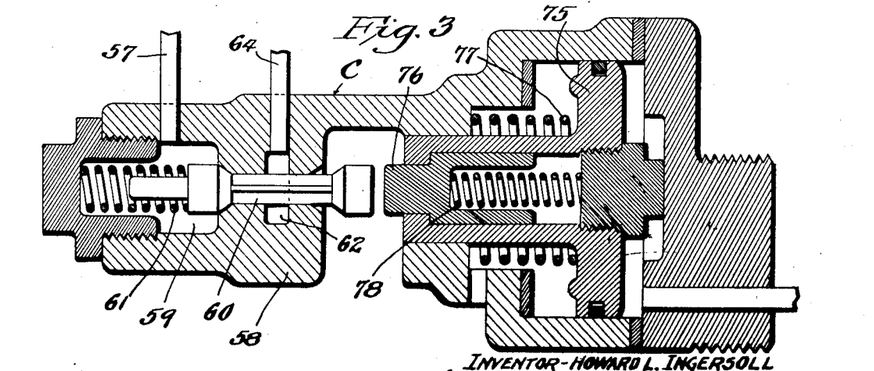
Fig. 3 is a detail view of another one of the valves used in said system.

54 indicates a pipe leading from chamber 50, said pipe being divided into two branches, one 56 leading to the bottom of the cylinder 26, hereinbefore described, so that the toggle mechanism is operated and the gears 18 and 28 of the clutch are thrown into mesh as a result of admitting pressure to pipe 54. Coincidently with thus entraining the booster motor with the axle it is to drive by means of the admission of pressure to the cylinder 26, just referred to, pressure also passes through a branch 57 of pipe 54 and enters a chamber in one end of a valve mechanism generally designated as "C", shown in Fig. 3. This valve consists of a casing 58 in one end of which there is a chamber 59 to which pressure is admitted by the pipe 57, just above referred to. This chamber is normally closed by a double-headed valve 60, held to its seat by means of a spring 61 so that although pressure is admitted to chamber 59 it cannot escape therefrom and assists in holding the outer head of valve 60 home. There is a chamber 62 formed in the casing approximately midway between the heads of the double headed valve 60 and this chamber 62 is normally open to atmosphere because the inner head of valve 60 is normally unseated, as shown in Fig. 3. A pipe 64 leads from this chamber 62 to the upper end of a cylinder 65 (see Fig. 4). In this cylinder 65 is a piston 66 normally held up by spring 67, rod 68 of the piston passing through the shell of the boiler and being connected to a lever 69 whose opposite end is connected to a valve rod 70 connected to a throttle valve 71 arranged in a valve casing 72 interposed in the dry steam pipe 73 whose upper end terminates in the steam dome, as shown in Fig. 4, and whose lower end connects to the steam chest of the booster engine (as shown in Figs. 1, 5, 6 and 7). It will be seen from the description of the apparatus thus far given that the operation by the reverse lever of valve 47, i. e., initial pressure controlling valve, which we may designate generally as "A", effects the throw of the fluid operated piston in cylinder 26, which we may generally designate as mechanism "B", and admits pressure to one side of a pilot valve, being valve 60, which we may generally designate as the valve mechanism "C".

When the engineer operates his throttle to admit steam to the main cylinder through the dry steam pipe 3, the pressure in said dry steam pipe passes up through a pipe 74 to a chamber containing a piston 75, said piston carrying a spring pressed plunger 76ª at its inner end which is in line with the inner head of valve 60. A spring 77 tends to hold piston 75 outwardly away from valve 60 at all times. A spring 78 interposed between the plunger 76ª and a plug in the piston tends to hold said plunger outwardly at all times and yieldingly press the inner head of valve 60 to its seat when the plunger operates the valve—the stroke of piston 75 being slightly greater than that necessary to actually seat the inner head of valve 60. Thus, when the engineer throws his throttle to admit steam to the main cylinders of the locomotive, he will operate piston 75 in valve mechanism C, and by seating the inner head of valve 60, close the exhaust from pipe 64 to atmosphere and establish communication between the pressure in chamber 59 and chamber 62, which pressure passing through pipe 64, will operate the throttle valve 71 in the dry steam pipe leading to the booster motor and thus admit pressure to said booster motor. The booster motor will thus be energized as long as the reverse lever maintains the valve 47 in its outer position and air pressure is admitted to the booster motor controlling system. In the normal operation of locomotives, it is the practice, after the locomotive has attained speed, for the engineer to retrieve the reverse lever one or two notches so as to shorten the stroke of the valve controlling mechanism for the main cylinders and permit the latter to operate partly on expansion, which also produces a partial vacuum. This is commonly called "hooking up". When the reverse lever is so retrieved, or moved to another position which will permit the spring 48 to force the outer head of valve 47 to its seat, the following will result: Pressure from the air reservoir to the booster motor controlling system will be shut off, booster valve 47 and exhaust port 49 will be open to atmosphere, and consequently the pressures in pipes 56 and 57 will be exhausted—the former permitting the spring 27 to depress the piston 25 in cylinder 26, breaking the toggle and disentraining the gears 18 and 28, thus disconnecting the booster motor from the trailer truck axle and at the same time, the pressure above the piston 66, which had held the booster motor throttle valve lifted will leak out and permit its spring 67 to raise the piston 66, thus closing said throttle valve. The throttle valve 71 will be closed by the exhaustion of pressure above the piston 66, notwithstanding the fact that during this time the piston 75 is still held inwardly by pressure from the dry steam pipe leading to the main cylinders of the locomotive. In the event that the locomotive is traveling at a low rate of speed, say, for instance, less than twelve miles an hour, and in going upgrade it is desired to "pick up" and augment the tractive powers of the locomotive by the booster motor, it is only necessary to depress the foot lever and push the reverse lever to its full forward position. In this operation, the gear 28 is rotating with the axle of the trailer truck, and the gear 18 must, therefore, make a running entrainment because as soon as the air pressure is admitted to the booster motor controlling system, the piston 75 being already in its innermost position, said air pressure will instantaneously operate the throttle valve in the dry steam pipe leading to the booster motor cylinders.

While I have shown the controlling devices for my improved booster motor in operative relation to the reverse lever of the main locomotive, it is obvious that any moving part in the controlling devices of the locomotive, either operated by the reverse lever and its connected parts, or the throttle valve lever and its connected parts, would answer, although I prefer on account of the usual precedent in operation, to operate the initial controlling valve in the air pressure system which controls the booster motor from the reverse lever.

In the drawings, I have shown a conventional illustration of the throttle valve indicated at 76 in Fig. 4, which is operated by the usual bell-crank lever through the medium of a rod 77 connected to the throttle lever 78 located in the cab of the engine, as shown in Fig. 1.

So far as I am aware, I am the first in the art to control a booster, complementary or supplemental motor for locomotives by the controlling devices and main driving mechanism of the locomotive, these being operated in the ordinary way whereby the controlling system for the booster motor is first made partially effective and then, when the driving mechanism of the main locomotive is started, fully effective, whereupon the booster motor becomes a driving factor in assisting in the driving operation of the main locomotive. By this dual control, I am enabled to most efficiently operate a booster motor at low speeds, as in starting the main locomotive, and then, when the main locomotive attains a predetermined high speed, cut out the booster motor, this cutting out being done when the assistance of the booster motor is no longer required.

This application is a continuation in part of my application, Serial Number 194,335, filed October 2, 1917, and renewed February 16, 1920, as Serial Number 359,201. I do not claim herein the arrangement of the booster motor on the trailer truck or the structural features of the truck and motor apart from the control system as this subject matter is claimed in said application, Serial No. 359,201.

What I claim is:

1. In a controlling mechanism for booster motors for steam locomotives, the combination of a moving part in the controlling devices of the locomotive, a booster motor, and means located in the path of movement of said moving part for controlling said booster motor.

2. In a controlling mechanism for booster motors for steam locomotives, the combination of a moving part in the controlling devices of the locomotive, a booster motor, and a valve located in the path of movement of said moving part and operable by said moving part in certain of its positions to control the operation of said booster motor.

3. In a controlling mechanism for booster motors for locomotives, the combination of a moving part in the controlling devices of the locomotive, a booster motor, a pressure supply system designed to furnish pressure to operate a throttle to said booster motor, and a valve operated by said moving part to control the pressure from said system to operate the throttle to said booster motor.

4. In a controlling mechanism for booster motors for locomotives, the combination of a moving part in the controlling devices of the locomotive, a booster motor, a clutch entrained with said booster motor, and a pressure means controlled by means in the path of said moving part for controlling said clutch.

5. In a controlling mechanism for booster motors for steam locomotives, the combination of the controlling mechanism of the locomotive, including a moving part thereof, a booster motor, and means disconnected from but operated by said moving part for controlling said booster motor.

6. In a controlling mechanism for booster motors for steam locomotives, the combination of the controlling mechanism of the locomotive, including a moving part thereof, a booster motor, and means in the path of movement of said moving part for rendering said booster motor operative.

7. In a controlling mechanism for booster motors for steam locomotives, the combination of the controlling mechanism of the locomotive, including a moving part thereof, a booster motor, and means in the path of movement of said moving part for rendering said booster motor operative and inoperative.

8. In a controlling mechanism for booster motors for locomotives, the combination of the controlling mechanism of the locomotive including a moving part, a booster motor, a throttle valve for said booster motor, and means operated by said moving part for controlling said throttle valve.

9. In a controlling mechanism for booster motors for locomotives, the combination of the controlling mechanism of the main locomotive, including a moving part, a booster motor, a clutch for said booster motor, and means operated by said moving part for controlling said clutch.

10. In a controlling mechanism for booster motors for locomotives, the combination of the controlling mechanism of the locomotive, including a moving part, a booster motor, a clutch and a throttle valve for said booster motor, and means operated by said moving part for controlling said throttle valve and clutch.

11. In a controlling mechanism for booster motors for locomotives, the combination of the controlling mechanism of the locomotive, including a moving part, a booster motor, a steam supply therefor, an air pressure system in control of the steam supply to said booster motor, and means operated by said moving part for controlling said air pressure system.

12. In a controlling mechanism for booster motors for locomotives, the combination of the controlling mechanism of the locomotive, including a movable part, a booster motor, a clutch for rendering said booster motor effective or ineffective, an air pressure system in control of said clutch, and means in said air pressure system and in the path of movement of said moving part for rendering said clutch operative or inoperative.

13. In a controlling mechanism for booster motors for locomotives, the combination of the controlling mechanism of the main locomotive, a booster motor, a steam supply therefor, an air pressure system in control of the steam supply to said booster motor, and means operated by the controlling mechanism of the locomotive for controlling said air pressure supply to said booster motor air pressure system.

14. In a controlling mechanism for booster motors for locomotives, the combination of the controlling mechanism of the locomotive, a booster motor, a steam supply therefor, an air pressure system in control of said booster motor, and a valve operated by the controlling mechanism of the main locomotive for admitting and shutting off pressure to said booster motor air pressure system.

15. In a controlling mechanism for booster motors for locomotives, the combination of the controlling mechanism of the locomotive, a booster motor, a steam supply therefor, an air pressure system in control of the steam supply to said booster motor and under control of the controlling mechanism of the main locomotive, said air pressure system including a pilot valve for controlling pressure to operate the throttle valve in the steam supply pipe to the booster motor, and a piston operated by pressure from the driving mechanism of the locomotive for actuating said pilot valve.

16. In a controlling mechanism for booster motors for locomotives, the combination of the controlling mechanism of the locomotive, a booster motor, a steam supply therefor, an air pressure system in control of the steam supply to said booster motor, said air pressure system also including a fluid actuated piston for operating a clutch mechanism whereby the booster motor may be entrained and disentrained from the axle with which it coöperates.

17. In a controlling mechanism for booster motors for locomotives, the combination of the controlling mechanism of the locomotive including a reverse lever, a booster motor, an air pressure system in control of said booster motor, and a valve in said air pressure system for controlling the supply of pressure thereto, said valve being operable by said reverse lever at the extreme limit of its movement.

18. In a controlling mechanism for booster motors for locomotives, the combination of the controlling mechanism of the locomotive including a reverse lever, a booster motor, an air pressure system in control of said booster motor, and a valve in said air pressure system for controlling the supply of pressure thereto, said valve being operable by said reverse lever at the extreme limit of its movement in each direction.

19. In a controlling mechanism for booster motors for locomotives, the combination of the controlling mechanism of the main locomotive including a reverse lever, a booster motor, a steam supply therefor, an air pressure system in control of the steam supply to said booster motor, a valve in control of said air pressure system, said valve being provided with a plunger in the path of movement of said reverse lever whereby when said reverse lever is moved to its extreme position said plunger is operated to admit pressure to said booster motor air pressure system, and when said lever is retracted, said plunger is released so that the pressure is exhausted from said booster motor air pressure system.

20. In a controlling mechanism for booster motors for locomotives, the combination of the controlling mechanism of the main locomotive including a reverse lever, a booster motor, an air pressure system in control of said booster motor, a valve in said air pressure system operable by said reverse lever whereby pressure is admitted to and exhausted from said booster motor air pressure system, and means located in the path of movement of said reverse lever for preventing the actuation of said valve except at the volition of the operator.

21. In a controlling mechanism for booster motors for steam locomotives, the combination of the controlling devices and driving mechanism of the main locomotive, a booster motor and means operable by said controlling devices and driving mechanism, respectively, for controlling said booster motor.

22. In a controlling mechanism for booster motors for steam locomotives, the combination of a booster motor and dual means operable by the main locomotive and its parts for controlling said booster motor.

23. In a controlling mechanism for booster motors for steam locomotives, the combination of a booster motor, an air pressure system in control thereof, and means identified with the controlling devices of the main locomotive for controlling said air pressure system.

24. In a controlling mechanism for booster motors for steam locomotives, the combination of a booster motor, an air pressure system in control thereof, and means identified with the driving mechanism of the main locomotive for controlling said air pressure system.

25. In a controlling mechanism for booster motors for steam locomotives, the combination of a booster motor, an air pressure system in control thereof, and means identified with the driving mechanism and the controlling devices of the main locomotive for controlling said air pressure system.

26. In a controlling mechanism for booster motors for steam locomotives, the combination of the controlling devices and the driving mechanism of the main locomotive, a booster motor, an air pressure system in control thereof, means operated by the controlling devices of the main locomotive for rendering said air pressure system partially effective, and means operated by the driving mechanism of the main locomotive for rendering said air pressure system fully effective.

27. In a controlling mechanism for booster motors for locomotives, the combination of a booster motor, means for initially placing said booster motor in condition for driving operation, and means automatically operated by the main locomotive for finally causing the booster motor to become an effective driving element.

28. In a controlling mechanism for booster motors for steam locomotives, the combination of the controlling devices of the driving mechanism of the main locomotive, a booster motor, an air pressure system in control thereof, means operated by the controlling devices of the main locomotive for rendering said air pressure system partially effective, and means operated by the driving mechanism of the main locomotive for finally causing said booster motor to become fully effective, and an active driving element complementing the main locomotive.

29. In combination with the main driving means of a steam propelled locomotive, a booster motor for aiding the main driving means in starting the locomotive and propelling it at low speeds, and a compressed air operated controlling mechanism for making said booster motor effective and ineffective.

30. In combination with the main driving means of a steam propelled locomotive, a steam actuated booster motor for aiding the main driving means in starting the locomotive and propelling it at low speeds, said booster motor having a disengageable driving connection with the locomotive, and controlling means for establishing said driving connection and supplying the motor with steam and for disentraining the booster motor and cutting off the steam supply therefrom.

31. In combination with the main driving means of a steam propelled locomotive, a steam actuated booster motor for aiding the main driving means in starting the locomotive and propelling it at low speeds, said booster motor having a disengageable driving connection with the locomotive, and compressed air operated controlling means for establishing said driving connection and supplying the motor with steam and for disentraining the booster motor and cutting off the steam supply therefrom.

32. In combination with the main driving means of a steam propelled locomotive, a booster motor for aiding the main driving means in starting the locomotive and propelling it at low speeds, a train of gears interposed between said booster motor and an otherwise idle axle of the locomotive, and means for disengaging one of said gears from another to disentrain the booster motor from said axle.

33. In combination with the main driving means of a steam propelled locomotive and its controlling devices, a booster motor for aiding the main driving means in starting the locomotive and propelling it at low speeds, the operation of which is dependent upon the manipulation of the controlling devices of said main driving means.

34. In combination with the main driving means of a steam propelled locomotive and its controlling devices, a booster motor for aiding the main driving means in starting the locomotive and propelling it at low speeds, and controlling mechanism for the booster motor comprising an element manipulatable by the engine man, which controlling mechanism is also dependent upon the manipulation of the controlling devices of the main driving means.

35. In combination with the main driving means of a steam propelled locomotive, a booster motor for aiding the main driving means in starting the locomotive and propelling it at low speeds, and controlling mechanism for the booster motor, dependent upon the manipulation of the controlling devices for the main driving means whereby the booster motor may be set in operation when the main driving means is started, and becomes inoperative when the main driving means is stopped.

36. In combination with the main driving means of a steam propelled locomotive, a booster motor for aiding the main driving means in starting the locomotive and propelling it at low speeds, and controlling mechanism for the booster motor, dependent upon the manipulation of the controlling devices for the main driving means, whereby the booster motor may be set in operation when the main driving means is started, and becomes inoperative when the controlling devices of the main driving means are hooked up to the position assumed in normal operation when the locomotive reaches a certain speed.

37. In combination with the main driving means of a steam propelled locomotive, a booster motor for aiding the main driving means in starting the locomotive and propelling it at low speeds, and controlling mechanism for the booster motor comprising an element manipulatable by the engine man, which controlling mechanism is also dependent upon the manipulation of the controlling devices of the main driving means, whereby said booster motor may be set in operation when the main driving means is started and becomes inoperative when the main driving means is stopped.

38. In combination with the main driving means of a steam propelled locomotive, a booster motor for aiding the main driving means in starting the locomotive and propelling it at low speeds, and controlling mechanism for the booster motor comprising an element manipulatable by the engine man, which controlling mechanism is also dependent upon the manipulation of the controlling devices of the main driving means, whereby said booster motor may be set in operation when the main driving means is started and becomes inoperative when the controlling devices of the main driving means are set to the position normally occupied when the locomotive reaches a given speed.

39. In combination with the main driving means of a steam propelled locomotive, a steam actuated booster motor for aiding the main driving means in starting the locomotive and propelling the same at low speeds, and controlling mechanism for the booster motor which may be operated to supply the same with steam only when steam is supplied to the main driving means.

40. In combination with the main driving means of a steam propelled locomotive and its controlling devices, a steam actuated booster motor for aiding the main driving means in starting the locomotive and propelling same at low speeds, said booster motor having a disengageable driving connection with the locomotive, and controlling mechanism for the booster motor which may be operated to establish the driving connection between the booster and the locomotive and to supply the booster with steam only when the controlling devices of the main driving means are manipulated to start said main driving means and which cuts off steam from the booster motor and disengages it from the locomotive when the controlling devices of the main driving means are manipulated to stop said main driving means or are set to the position normally occupied after the locomotive has reached a given speed.

41. In combination with the main driving means of a steam propelled locomotive and its controlling devices, a steam actuated booster motor for aiding the main driving means in starting the locomotive and propelling the same at low speeds, said booster motor having a disengageable driving connection with the locomotive, and controlling mechanism for the booster motor which may be operated to establish the driving connection between the booster and the locomotive and to supply the booster with steam only when the controlling devices of the main driving means are manipulated to start said main driving means and which cuts off steam from the booster motor and disengages it from the locomotive when the controlling devices of the main driving means are manipulated to stop said main driving means or are set to the position normally occupied after the locomotive has reached a given speed, said controlling mechanism comprising also an element manipulatable independently of the controlling devices of the main driving means, the manipulation of which is necessary in order that the booster motor should be set in operation.

42. In combination with the main driving means of a steam propelled locomotive and its reverse lever, a booster motor for aiding the main driving means in starting the locomotive and in propelling the same at low speeds, and controlling mechanism for said booster motor, the operation of which, to put said motor in condition for operation, is dependent upon the reverse lever being in an extreme position.

43. In combination with the main driving means of a steam propelled locomotive and its reverse lever, a booster motor for aiding the main driving means in starting the locomotive and in propelling the same at low speeds, and controlling mechanism for said booster motor, the operation of which, to put said motor in condition for operation, is dependent upon the reverse lever being in an extreme position and upon the main driving means being supplied with steam.

44. In combination with the main driving means of a steam propelled locomotive and its reverse lever, a booster motor for aiding the main driving means in starting the locomotive and in propelling the same at low speeds, and controlling mechanism for said booster motor, the operation of which, to put said motor in condition for operation, is dependent upon the reverse lever being in an extreme position and which operates, when the reverse lever is moved from said extreme position to put the booster motor out of operation.

45. In combination with the main driving means of a steam propelled locomotive and its reverse lever, a booster motor for aiding the main driving means in starting the locomotive and in propelling the same at low speeds, and controlling mechanism for said booster motor, the operation of which, to put said motor in action, is dependent upon the driving means being supplied with steam, and which operates, when said reverse lever is moved from said extreme position, to put the booster motor out of operation whether or not steam is being supplied to the main driving means.

46. In combination with the main driving means of a steam propelled locomotive and its reverse lever, a booster motor for aiding the main driving means in starting the locomotive and in propelling the same at low speeds, controlling mechanism for said booster motor, the operation of which, to put said motor in condition for operation, is dependent upon the reverse lever being in an extreme position, and a movable element which normally prevents said reverse lever from being put into such extreme position.

47. In combination with the main driving means of a steam propelled locomotive and its reverse lever, a booster motor for aiding the main driving means in starting the locomotive and in propelling the same at low speeds, controlling mechanism for said booster motor, the operation of which, to put said motor in condition for operation, is dependent upon the reverse lever being in an extreme position, a movable element which normally prevents said reverse lever from being put into such extreme position, and means independently manipulatable by the engine man for moving said element to permit the release lever to assume such position.

48. In combination with the main driving means of a steam propelled locomotive and its reverse lever and throttle controlling device, a booster motor for aiding the main driving means in starting the locomotive and in propelling the same at low speeds, the operation of which is conditioned upon the reverse lever being in a full starting position.

49. In combination with the main driving means of a steam propelled locomotive and its reverse lever and throttle controlling device, a booster motor for aiding the main driving means in starting the locomotive and in propelling the same at low speeds, the operation of which is conditioned upon the reverse lever being in a full starting position and is also conditioned upon the throttle valve of the main driving means being opened to admit steam to said main driving means.

50. In combination with the main driving means of a steam propelled locomotive and its reverse lever and throttle controlling device, a booster motor for aiding main driving means in starting the locomotive and in propelling the same at low speeds, the operation of which is conditioned upon the reverse lever being in a full starting position and is also conditioned upon the throttle valve of the main driving means being opened to admit steam to the main driving means, and means whereby the movement of the reverse lever from said certain position puts the booster motor out of action.

51. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and a throttle valve, a fluid pressure operated device for establishing said driving connection and for disengaging the booster from the locomotive, a fluid pressure operated device for controlling the booster motor throttle, and a valve the movements of which are governed by said reverse lever for admitting and excluding fluid pressure to and from said fluid pressure operated devices.

52. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and a throttle valve, a fluid pressure operated device for establishing said driving connection and for disengaging the booster motor from the locomotive, a fluid pressure operated device for controlling the booster motor throttle, a valve the movements of which are governed by said reverse lever for admitting and excluding fluid pressure to and from said fluid pressure operated devices, and means which, in the normal operation of the locomotive, prevents the movement of the reverse lever at high speeds of the locomotive, from operating the valve but permits such operation at low speeds.

53. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and a throttle valve, a fluid pressure operated device for establishing said driving connection and for disengaging the booster motor from the locomotive, a fluid pressure operated device for controlling the booster motor throttle, a valve the movements of which are governed by said reverse lever for admitting and excluding fluid pressure to and from said fluid pressure operated devices, and independently manipulatable means, the manipulation of which conditions the control of the booster through the movements of the reverse lever.

54. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and a throttle valve, a fluid pressure operated device for establishing said driving connection and for disengaging the booster motor from the locomotive, a fluid pressure operated device for controlling the booster motor throttle, a valve, the movements of which are governed by said reverse lever for admitting and excluding fluid pressure to and from said fluid pressure operated devices, and a device actuated by steam when the throttle valve of the main driving means is open, the actuation of which conditions the operation of said last named fluid pressure operated device.

55. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and the throttle valve, a source of supply of compressed air, a compressed air operated device for effecting the engagement and disengagement of the booster motor with and from the locomotive, a compressed air operated device for controlling the booster motor throttle, and a valve for admitting air to said compressed air operated devices which is opened when the reverse lever is moved to an extreme position and is closed when the lever is moved from said position.

56. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and the throttle valve, a source of supply of compressed air, a compressed air operated device for effecting the engagement and disengagement of the booster motor with and from the locomotive, a compressed air operated device for controlling the booster motor throttle, a valve for admitting air to said compressed air operated devices which is opened when the reverse lever is moved to an extreme position and is closed when the lever is moved from said position, and independently manipulatable means, the manipulation of which is necessary in order that the reverse lever be moved to said extreme position.

57. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and the throttle valve, a source of supply of compressed air, a compressed air operated device for effecting the engagement and disengagement of the booster motor with and from the locomotive, a compressed air operated device for controlling the booster motor throttle, a valve for admitting air to said compressed air operated devices which is opened when the reverse lever is moved to an extreme position and is closed when the lever is moved from said position and a device actuated by steam when the throttle of the main driving means is open, the actuation of which conditions the operation of said second named compressed air operated device.

58. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and a throttle valve, a controlling device for effecting the engagement and disengagement of the booster motor with and from the locomotive, a controlling device for operating the booster motor throttle valve, and means whereby the operation of said last named devices is governed by the manipulation of said reverse lever.

59. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and a throttle valve, a controlling device for effecting the engagement and disengagement of the booster motor with and from the locomotive, a controlling device for operating the booster motor throttle valve, and means whereby the operation of said last named devices is governed by the manipulation of said reverse lever and whereby the operation of said second named controlling device is conditioned upon the throttle valve of the main driving means being open to supply the main driving means with steam.

60. In combination with the main driving means of a steam propelled locomotive and its reverse lever and throttle valve, a steam actuated booster motor for aiding the main driving means in starting the locomotive and in propelling the same at low speeds, which motor has a disengageable driving connection with the locomotive and a throttle valve, a controlling device for operating the booster motor throttle valve, means whereby the operation of said last named devices is governed by the manipulation of said reverse lever, and independently manipulatable means, the manipulation of which prevents the reverse lever from operating said controlling devices to put the booster motor in action.

61. In combination with the main driving means of a steam propelled locomotive and its throttle valve and reverse lever, a steam actuated booster motor for aiding the main driving means in starting the locomotive and propelling the same at low speeds, said booster motor having a throttle valve and a disengageable driving connection with the locomotive means, the operation of which is dependent upon the position of the reverse lever for establishing and disestablishing said driving connection, and means which is dependent upon the position of the reverse lever and also upon the position of the throttle for the main driving means for operating the booster motor throttle.

62. In combination with the main driving means of a steam propelled locomotive and its throttle valve and reverse lever, a steam actuated booster motor for aiding the main driving means in starting the locomotive and propelling the same at low speeds, said booster motor having a throttle valve and a disengageable driving connection with the locomotive, means, the operation of which is dependent upon the position of the reverse lever for establishing and disestablishing said driving connection, means which is dependent upon the position of the reverse lever and also upon the position of the throttle for the main driving means for operating the booster motor throttle, and independent means manipulatable by the engine man which in its normal position prevents the reverse lever from being moved to put the booster motor in operation.

63. In combination with the main driving means of a steam propelled locomotive and its throttle valve and reverse lever, a steam actuated booster motor for aiding the main driving means in starting the locomotive and propelling the same at low speeds, said booster motor having a throttle valve and a disengageable driving connection with the locomotive, means, the operation of which is dependent upon the position of the reverse lever for establishing and disestablishing said driving connection, means which is dependent upon the position of the reverse lever and also upon the position of the throttle for the main driving means for operating the booster motor throttle, and means which normally prevents the reverse lever from being moved to put the booster motor in operation.

64. In combination with the main driving means of a steam propelled locomotive and its reverse lever, dry steam pipe and throttle valve, a seam actuated booster motor for aiding the main driving means in starting the locomotive and propelling it at low speeds, a source of supply of compressed air, means for entraining and disentraining the booster motor with an axle of the locomotive comprising a cylinder and spring pressed piston, a throttle valve for the booster motor, means for operating the throttle valve comprising a cylinder and spring pressed piston, a valve for controlling the introduction of compressed air to said last named cylinder, a steam actuated device connected with the dry steam pipe of the locomotive for opening said last named valve, a pipe leading from the source of supply and having branches, one to the first named cylinder and the other to the controlling valve for the last named cylinder, and a valve in said pipe adapted to be opened when the reverse lever is set to its extreme position, a dog which normally prevents the lever from being moved to said position, and means for moving said dog from its normal position.

65. An auxiliary power motor for locomotives connected to drive weight-supporting wheels thereof, said motor being controlled by the controlling means for the main cylinders of the locomotive, and independently controlled so that said auxiliary engine may be cut in at low speeds and cut out at higher speeds.

66. An auxiliary power motor for locomotives connected to drive weight-supporting wheels thereof, said motor being controlled by the controlling means for the main cylinders of the locomotive, and being reversible by the reversing lever controlling the main cylinders of the locomotive.

67. In a locomotive, the combination with main driving wheels and their driving mechanism, of independently mounted wheels which normally support a part of the weight of the locomotive, a booster motor having driving connection with said weight-supporting wheels, and means for controlling said booster motor whereby it may be cut in at low speeds and cut out at higher speeds.

68. The combination with the boiler and frame of a locomotive, main driving wheels, driving mechanism for said main driving wheels, weight supporting wheels for supporting part of the weight of the locomotive, independent driving mechanism connected to said weight supporting wheels which may be cut in at low speeds and cut out at higher speeds, and means for carrying said independent driving mechanism whereby its weight is not imposed upon said main or normal driving wheels.

69. The combination with the main or normal driving wheels of a locomotive and their driving mechanism, of independently mounted wheels which normally support a part of the weight of the locomotive, a booster motor having driving connection with said weight supporting wheels, and means for rendering the driving connection between said booster motor and said weight supporting wheels operative at low speeds of the locomotive and inoperative at higher speeds.

70. An auxiliary power motor for locomotives connected to drive weight-supporting wheels thereof, said motor being controlled by the controlling means for the main cylinders of the locomotive, and separate means for controlling the operation of said power motor.

71. The combination with a locomotive trailer truck, of a wheel-carrying axle mounted for operation in said truck, a motor having driving connections with said axle, said motor being controlled by the controlling means for the main cylinders of the locomotive, and separate means for controlling the operation of said motor.

72. The combination with a locomotive trailer truck, of a wheel carrying axle mounted for operation in said truck, a motor having driving connections with said axle, said motor being controlled by the controlling means for the main cylinders of the locomotive and said truck being free for independent radial movement.

73. The combination with a locomotive, of a booster motor associated therewith to supplement the main driving mechanism of the locomotive only at low speeds of the locomotive, and controlling means for said booster motor which is operated by the controlling means for the main driving mechanism.

In testimony whereof I hereunto affix my signature this 14th day of May, 1919.

HOWARD L. INGERSOLL.